Patented Dec. 9, 1941

2,265,641

UNITED STATES PATENT OFFICE 2,265,641

PRODUCTION OF BUTADIENE BY THE DEHYDROGENATION OF BUTYLENE

Otto Grosskinsky, Schkopau, and Nikolaus Roh and Gunthard Hoffmann, Lugwigshafen-on-the-Rhine, Germany, assignors, by mesne assignments, to Jasco, Incorporated, a corporation of Louisiana No Drawing. Application May 16, 1939, Serial No. 273,963. In Germany May 24, 1938

5 Claims. (Cl. 260—680)

The present invention relates to the production of butadiene by the dehydrogenation of butylene.

For the dehydrogenation of aliphatic or aromatic hydrocarbons and of naphthenes, various oxides of light and heavy metals have already been proposed as catalysts. In the dehydrogenation of butylene to butadiene, the usual catalysts lose their activity after a short time by reason of the deposition of soot on their surface, even when working in the presence of diluents, such as carbon dioxide, nitrogen or steam. Furthermore, the catalysts usually favor a far-reaching decomposition of the butylene into hydrocarbons having a lower number of carbon atoms, as for example propylene, ethylene and methane.

We have now found that butadiene can be obtained from normal butylenes, in particular from beta-butylene, in an advantageous manner and with good yields by leading the normal butylenes diluted with steam and at temperatures between 500° and 700° C., in particular between 560° and 680° C. over catalysts which consist mainly (i. e. to the extent of more than 50 per cent) of zinc oxide and which also contain oxides of chromium or vanadium, molybdenum, uranium or tungsten or mixtures thereof.

These activating oxides may be used in various forms; chromium oxides may for example be used in the form of chromic oxide or in the form of chromic acid anhydride. Salts of acid forming oxides, such as chromates or chromites, especially salts from zinc or another bivalent metal may also be used. The oxides of vanadium, molybdenum, uranium or tungsten may be used either in the form of vanadic, molybdic, uranic or tungstic acid anhydrides or in the form of salts thereof which behave like mixtures of these acid oxides with the salt forming basic oxide.

The catalysts may be prepared by precipitating the activating oxides on the zinc oxide or by admixing zinc oxide with salts, preferably zinc salts, of the activating oxides, and thereafter, if desired, heating the mixture in the presence of hydrogen. Besides zinc oxide other basic oxides or hydroxides, for example those of earth alkali metals or magnesium or aluminium may be employed, it being understood that more than 50 per cent of the catalyst consist of zinc oxide.

The amount of the activating oxide which is used together with zinc oxide may be relatively small, for example, only 10 per cent or less down to for example 1 per cent. Especially good yields are obtained when the catalysts are substantially free from iron and when the hot reaction gases are prevented from contact with iron parts of the apparatus.

It is preferable to use the normal butylenes diluted with at least an equal volume of steam. In the case of specially high speeds of flow, somewhat smaller amounts of steam, for example 0.8 part per volume for 1 part of butylene, may be used, however, without the yield being impaired by the splitting of the butylene into hydrocarbons having a smaller number of carbon atoms. Generally speaking the amount of steam should not be more than 10 times the amount of butylene. Part of the steam may also be replaced by other inert diluents.

The mixture of butylene and steam should be led over the catalyst so rapidly that only part of the butylene, preferably between 10 and 50 per cent thereof is actually reacted. The most suitable time of contact of the gas mixture with the catalyst depends on the temperature and on the butylene content of the mixture and on the catalyst used. The term "contact time" refers to the time during which one unit by volume of the mixture of butylene and steam is in contact with the catalyst in the reaction room at reaction temperature.

The invention is particularly suitable for the dehydrogenation of beta-butylene or mixtures of normal-butylenes containing a preponderating amount of beta-butylene. Pure alpha-butylene is less suitable because it yields butadiene in an amount inferior to that obtained from beta-butylene.

According to this invention the catalysts remain free from carbon, even after use for long periods, and uniform, good conversion of butylene to butadiene is continuously obtained and practically no undesirable side reactions occur.

The following examples will further illustrate how this invention may be carried out in practice but the invention is not restricted to these examples. The parts are by weight unless otherwise stated. In all examples a steel tube, the interior of which is lined with copper containing a small amount of manganese, is used as reaction chamber.

Example 1

A mixture of 20 parts by volume of alpha- and 80 parts of beta-butylene diluted with six times the volume of steam is led at 580° C. over a catalyst consisting of 90 per cent of zinc oxide and 10 per cent of chromium oxide with a time of contact of about 0.5 second. Even after operation for long periods, the conversion by a single passage amounts to uniformly more than 20 per cent with a good yield of butadiene. No soot is deposited on the catalyst.

Example 2

A mixture of beta-butylene and steam is led at 600° C. over a catalyst consisting of 80 parts of zinc oxide, 10 parts of calcium chromate and 20 parts of aluminium oxide with a time of contact of about 0.5 second. The conversion by a single passage is about 20 per cent and the yield of butadiene is more than 70 per cent of the butylene reacted. The catalyst does not lose its activity.

Example 3

A mixture of 60 parts of zinc oxide, 20 parts of aluminium oxide and 10 parts of calcium oxide is impregnated with such an amount of chromium nitrate solution that the chromium oxide content of the catalyst after glowing is about 2 per cent. The catalyst, preferably used in the shaped condition, dehydrogenates beta-butylene in the presence of an equimolecular amount of steam to form good yields of butadiene without its activity subsiding appreciably. (Time of contact about 0.5 second.)

Example 4

A mixture of equal parts by volume of beta-butylene and steam is led with a time of contact of about 0.5 second at from 550° to 600° C. over a catalyst consisting of zinc oxide on which 1.5 per cent of molybdic acid anhydride has been precipitated. The conversion by a single passage is from 15 to 20 per cent and the yield of butadiene calculated on the amount of butylene reacted is very satisfactory. The catalyst remains free from deposition of soot and does not lose its activity even after use for long periods.

Example 5

A mixture of 65 parts of zinc oxide and 30 parts of calcium aluminate is impregnated with an aqueous solution of such an amount of ammonium vanadate that after shaping, drying and glowing the resulting catalyst contains about 5 per cent of vanadium oxide (vanadic acid anhydride). A mixture of beta-butylene and steam in the ratio by volume of 1:5 is led over the catalyst with a time of contact of about 0.5 second. The conversion by a single passage amounts to about 20 per cent of the butylene used and total yields of butadiene of more than 70 per cent of the theoretical yield are obtained. The catalyst remains active for a long working period.

When a mixture of butylene and steam is led over a catalyst as described above which contains instead of vanadium oxide a corresponding amount of tungsten oxide (obtained from ammonium tungstate) a gas is obtained at from 550 to 600° C. which contains about 15 per cent of butadiene.

Example 6

A shaped catalyst consisting of zinc oxide containing 5 per cent of ammonium uranyl acetate dehydrogenates butylene in the presence of an equimolecular amount of steam at from 550 to 600° C. to form good yields of butadiene. There is no deterioration of the catalyst by reason of deposition of soot.

Example 7

4,670 liters of a gaseous mixture consisting of 1 part by volume of beta-butylene and 6.7 parts of steam per hour are led over 2.4 liters of a shaped catalyst consisting of a mixture of 95 per cent of zinc oxide and 5 per cent of chromium oxide. At a temperature from 640° to 660° C. 23.9 per cent of the butylene are reacted by a single passage with a contact time of 0.39 second. The yield of butadiene amounts to more than 75 per cent of the theoretical yield corresponding to a daily butadiene production of more than two kilograms for each liter of the catalyst. The reaction gases are free from propylene. The activity of the catalyst is maintained for several months.

What we claim is:

1. A process for the production of butadiene by dehydrogenation of butylene which consists in leading a gaseous mixture of normal-butylene with steam at temperatures between 500° and 700° C. over a catalyst containing more than 50 per cent of zinc oxide and containing also at least one oxide of an element of the group consisting of chromium, vanadium, molybdenum, uranium and tungsten.

2. A process for the production of butadiene by dehydrogenation of butylene which consists in leading a gaseous mixture of normal-butylene with steam at temperatures between 500° to 700° C. over a catalyst containing more than 50 per cent of zinc oxide and containing from 1 to 10 per cent of at least one oxide of an element of the group consisting of chromium, vanadium, molybdenum, uranium and tungsten.

3. A process for the production of butadiene by dehydrogenation of butylene which consists in leading a gaseous mixture of normal-butylene with steam at temperatures between 500° and 700° C. over a catalyst containing between 90 and 99 per cent of zinc oxide and between 10 and 1 per cent of chromium oxide.

4. A process for the production of butadiene by dehydrogenation of butylene which consists in leading a gaseous mixture of normal-butylene with steam at temperatures between 500° and 700° C. over a catalyst consisting of at least 90 per cent of a mixture of zinc oxide with at least one basic oxide other than zinc oxide, and containing from 1 to 10 per cent of at least one oxide of an element of the group consisting of chromium, vanadium, molybdenum, uranium and tungsten, the catalyst containing more than 50 per cent of zinc oxide.

5. A process for the production of butadiene by dehydrogenation of butylene which consists in leading a gaseous mixture of normal-butylene with steam at temperatures between 500° and 700° C. over a catalyst containing at least 90 per cent of a mixture of zinc oxide with at least one basic oxide other than zinc oxide and containing between 1 and 10 per cent of chromium oxide, the catalyst containing more than 50 per cent of zinc oxide.

OTTO GROSSKINSKY.
NIKOLAUS ROH.
GUNTHARD HOFFMANN.